Figure 1:
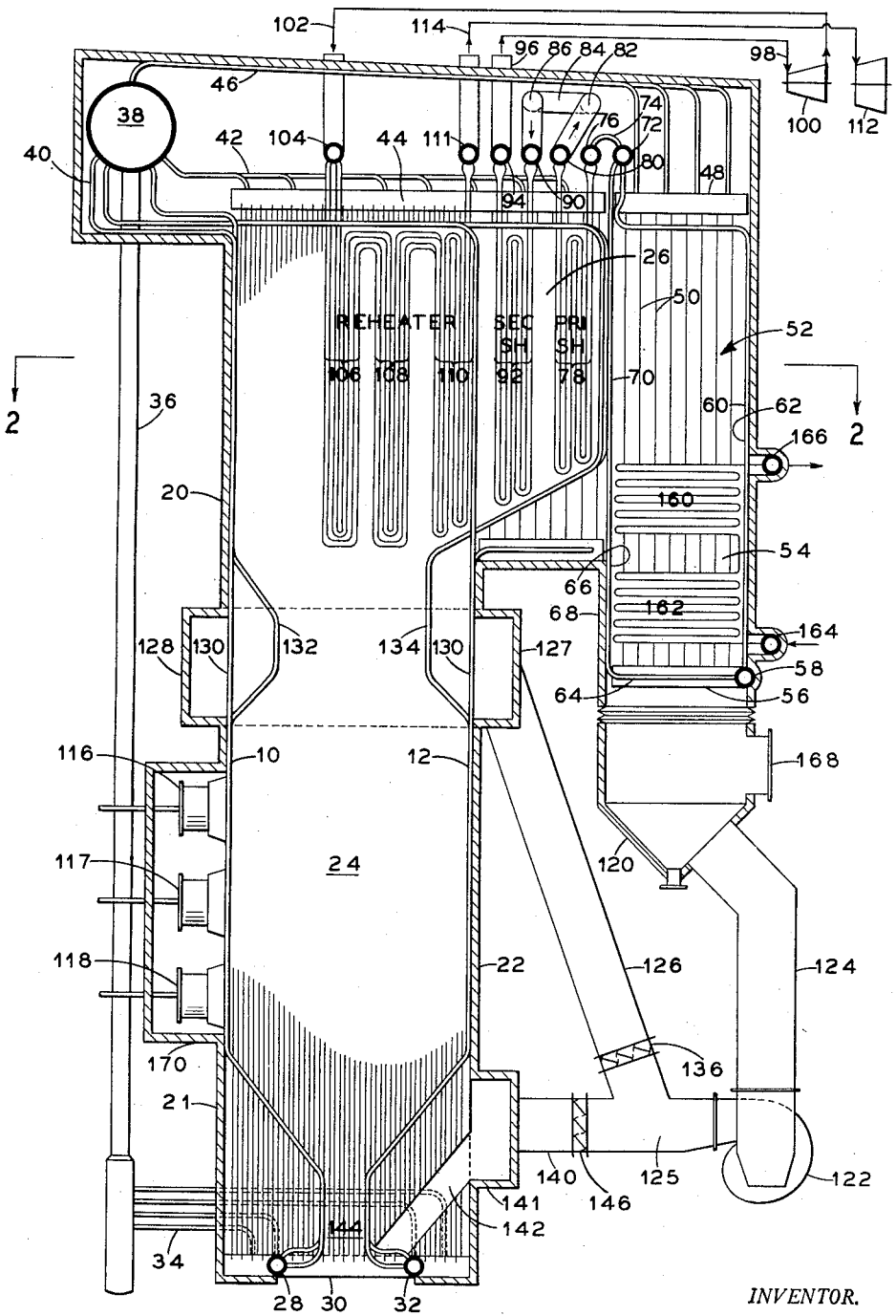

Aug. 4, 1959

P. H. KOCH 2,897,797

STEAM GENERATING, SUPERHEATING, AND REHEATING
UNIT, AND METHOD EFFECTED THEREBY

Filed June 13, 1956

2 Sheets-Sheet 1

INVENTOR.
Paul H. Koch
BY
*R. H. Holbrook*
ATTORNEY

INVENTOR.
Paul H. Koch

United States Patent Office 2,897,797
Patented Aug. 4, 1959

2,897,797

STEAM GENERATING, SUPERHEATING, AND REHEATING UNIT, AND METHOD EFFECTED THEREBY

Paul H. Koch, Bernardsville, N.J., assignor to The Babcock & Wilcox Company, New York, N.Y., a corporation of New Jersey Application June 13, 1956, Serial No. 591,136

10 Claims. (Cl. 122—478)

This invention relates to the art of generation of high pressure steam for power purposes and the concomitant superheating and reheating of the generated steam for use in a prime mover including a plurality of stages utilizing the heated steam at different pressures. The invention also involves apparatus for, and a method of, so controlling the temperature or temperatures of the superheated and the reheated steam that such temperature or temperatures may be maintained at a predetermined value or values over a wide range of load (or rate of vapor generation) where, otherwise, the temperature or temperatures of the reheated and the superheated steam would vary widely from a predetermined value or values, to the substantial detriment of efficient power production.

In a more specific sense, the invention involves the generation of high pressure steam by the radiant transmission of heat from high temperature combustion gases to enclosed streams of a vaporizable liquid bordering a combustion zone, the reheating of the generated steam by the predominantly radiant transmission of heat to enclosed steam flows from high temperature combustion gases beyond a substantial part of the steam generation zone, the superheating of the generated steam by the predominantly convection transmission of heat from the combustion gases after loss of heat therefrom in the radiant steam superheating zone, and such control of the final temperatures of the reheated steam and the superheated steam over a wide load range that the superheated and reheated steam temperature or temperatures may be maintained at a predetermined value or values, such control of reheat and superheat being effected by the variable control of the recycling of the combustion gases in different proportions to different positions forwardly of the zone of radiant steam superheating, the recycled gases being withdrawn from the gas flow after they have lost heat in the superheating zone. This method, in its more specific sense, involves the introduction of the recycled gases into the combustion gases in the steam generating zone in a proportion increasing as the rate of steam generation decreases. The method also involves the introduction of an increasing flow of the recycled gases as tempering gases in such a manner as to limit the temperature of the combustion gases as they enter the zone of steam reheating, this temperature regulation also regulating the tube fouling or slagging conditions in the reheating zone, when the combustion gases are originated by the burning of a slag forming fuel. The invention also involves the recycling of a controlled proportion of the gases as recirculated gases, for superheat control. The invention involves the controlled proportioning of the total flow of recycled gases between the tempering gas flow and the recirculated gas flow to maintain the final temperatures of the superheated steam and the reheated steam at predetermined value or values over a wide load range.

For attaining the above indicated results, the invention involves a steam generating unit which includes, in the unitary manner, a reheater and a superheater. Preferably, the reheater includes a plurality of tube platens arranged in rows transversely of gas flow, the platens of the first and second rows being widely spaced in order to receive heat from high temperature combustion gases primarily by radiant heat transmission, and for the purpose of minimizing the detrimental effects of the accumulation of solids upon the tubes particularly when the first two rows of reheater platens are disposed in the upper part of a furnace chamber supplied with high temperature heating gases by furnace firing means burning a slag forming fuel. In a more specific sense, the invention includes a vertically elongated furnace chamber with its walls and other boundary surfaces including steam generating tubes supplied with water at their lower ends by an appropriate circulatory system. In one embodiment of the invention, pulverized fuel burners are disposed at the lower portion of the furnace chamber and the first rows of reheater platens are disposed at the upper part of the furnace chamber adjacent the entrance of a lateral or horizontal gas pass in which the steam superheater as well as the third row of reheater platens are disposed and arranged transversely of gas flow. In this embodiment of the invention, the furnace chamber is fired at temperatures which may be above the fusion temperature of the particles of incombustibles in the fuel. Also, the furnace is supplied with a sufficient degree of cooling by the steam generating tubes that such particles, separating from the gas stream are transmuted to a relatively dry or solid state in which they pass from the furnace through the throat of a hopper bottom delineated by parts of the vapor generating tubes.

In the lateral gas pass and rearwardly of the reheater, a bank of closely spaced and serially connected tube sections constitute a secondary superheater, and rearwardly of the secondary superheater a similar bank of closely spaced upright tubular sections constitutes at least a part of the primary superheater, all of the banks of steam superheater tubes and the rows of reheater tube platens being distributed entirely across the full width of the gas flow from the furnace chamber.

Certain features of my invention are disclosed in my copending application S.N. 278,872, filed March 27, 1952.

The invention will be set forth in a concise manner in the accompanying claims, but for a better understanding of the invention, its advantages and uses, reference should be had to the following description which refers to the accompanying drawings.

Figure 2:
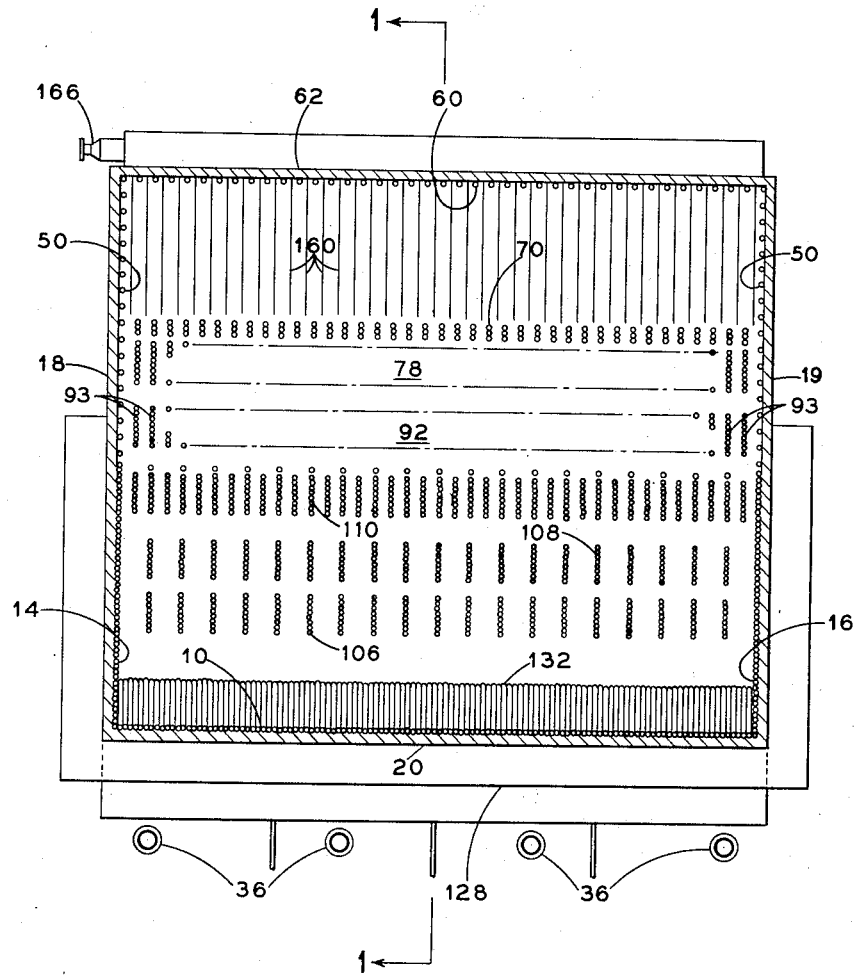

In the drawings:

Fig. 1 is a vertical section or side sectional view of a steam generating unit constructed in accordance with the teachings of the invention; and Fig. 2 is a horizontal section taken on the line 2—2 of Fig. 1.

Referring to the drawings, steam is generated in the furnace wall tubes such as the front wall tubes 10, the rear wall tubes 12 and the side wall tubes 14 and 16 which together with appropriate thermal insulation indicated at 18—22 form at least predominant parts of the walls and other boundary surfaces of the vertically elongated furnace chamber 24 and the horizontal gas pass 26 associated therewith. The steam generating furnace wall tubes are appropriately provided with water by a suitable circulatory system including the lower headers 28, 30 and 32, the circulators 34, one or more downcomers 36, the steam and water drum 38, such circulatory connections as those indicated at 40 and 42, and upper side wall headers such as 44.

The steam generating tubes discharge steam and water mixtures into the drum 38 wherein appropriate means are provided for separating the water from the steam. Such steam and water separating means are illustrated in the U.S. patent to Rowand et al. 2,289,970 of July 14, 1942. The separated steam flows from the drum through a plurality of conduits or circulators such as that shown at 46. They conduct the steam to upper headers such as 48 from which the steam flows downwardly through a plurality of tubes 50 arranged in wall alignment along the side walls of the gas turning chamber 52 and the subjacent downflow gas pass 54. These tubes terminate in the side wall portions 56 of a U-shaped header disposed at the lower part of the downflow of gas pass 54, the steam receiving heat from the furnace gases as it flows through the tubes 50. From the side wall header portions 56, the steam flows to the intermediate header portion 58 of the U-shaped header and thence upwardly through the tubes 60 arranged in wall alignment along the rear wall 62 of the unit. Part of the steam leaves the header portion 58 through another row of tubes having the lower horizontal portions 64 and succeeding upright portions 66 arranged in alignment along the wall 68 and extending upwardly therefrom in the same plane as screen tube portions 70 disposed across horizontal gas flow through the gas pass 26 to the gas turning space 52. These tubes continue upwardly to the superheater header 72 with which the upper ends of the tubes 60 are also connected.

From the superheater header 72 the steam flows through a plurality of conduits or circulators 74 to a succeeding superheater header 76 with which there are connected the inlets of rows of tubes which present a bank of closely spaced upright and serially connected tubular sections forming the bank of tubes 78 of the convection primary superheater, the spacing and arrangement of the rows of tubular sections in this bank of tubes being indicated in Fig. 2.

The outlets of the rows of tubes constituting the primary superheater 78 communicate with the primary superheater outlet header 80 from which steam flows through a conduit 82, a spray attemperator 84 and a conduit 86 to the inlet header 90 of the convection secondary superheater 92, the spray attemperator being preferably of the type illustrated and described in the patent to Fletcher et al. 2,550,683 of May 1, 1951 and preferably functioning from appropriate variables such as the final temperature of the superheated steam to increase the amount of water sprayed into the steam as the temperature of that steam tends to depart upwardly from an optimum value.

The secondary superheater 92, like the primary superheater 78, is formed by a plurality of rows of tubes having upright tubular sections closely spaced and connected for the series flow of steam therethrough. These tubular sections are also arranged as platens such as those indicated at 93 in Fig. 2. These platens are arranged in closely spaced relationship and distributed, as a bank of tubes, entirely across the gas flow in the lateral gas pass 26.

From the tubes of the secondary superheater 92, the superheated steam flows to a header 94 and thence through a conduit 96 to the inlet 98 of the high pressure stage 100 of a steam turbine. After the steam has been expanded in the performance of useful work in this stage of the turbine, it is exhausted through the line 102 to the inlet header 104 of the reheater. In the reheater, the steam flows through a plurality of rows of closely spaced tubes having upright and closely spaced tubular sections formed as three rows of platens such as 106, 108 and 110. In the row 110, the platens are closely spaced so as to constitute substantially a bank of closely spaced tubes extending entirely across the gas flow in the gas pass 26 and receiving heat predominantly by convection. The platens of the other rows 106 and 108 are disposed on widely spaced centers in the upper part of the furnace chamber 24, as particularly indicated in the drawings, this arrangement, with the concomitant circumstances, resulting in the transmission of heat from the high temperature furnace gases to the platens of the rows 106 and 108 predominantly by radiation.

From the rows of tubes constituting the reheater, the steam flows through the reheater outlet header 111 and thence through a conduit 114 to the inlet of the lower pressure stage 112 of the steam turbine.

With all of the rows of pulverized fuel burner 116—118 in operation at high rating, the furnace gas temperatures within the lower part of furnace chamber 24 may be so high as to require reduction thereof before the gases enter the steam reheating zone. Such temperature reduction is effected by the withdrawal from the hopper 120, at the lower part of the downflow gas pass 52, of furnace gases through the fan 122 and the associated ductwork components 124—128 and the introduction of those gases into the furnace chamber through openings between intermediate portions 130 of the furnace wall tubes formed by bending out of the wall formation of alternate wall tubes to designate the arch screens 132 and 134. The flow of recycled gases, as tempering gases through the ductwork components 124—128 may be variablby controlled by dampers such as those indicated at 136 between the ductwork components 125 and 126. This flow of tempering gases may be also automatically controlled from appropriate variables including final reheated steam temperature and rate of steam flow, the rate of flow of tempering gases through the ductwork components 126—128 being decreased as load decreases.

To compensate for an inherent characteristic of the superheater whereby it tends to effect a final steam temperature below optimum temperature while load decreases in a lower part of the load range, an increasing flow of recirculated gases is provided through the ductwork components 140—142 to the hopper throat 144, this flow of recirculated gases being controlled by the dampers 146 and preferably automatically controlled from a combination of variables including load (or rate of vapor generation) and final superheated steam temperature. As the load decreases and the flow of recirculated gases into the hopper throat increases, the increased mass flow of gases over the primary superheater 78 and the secondary superheater 92 will afford such increased heat input to those sections of the superheater that the final temperature of the superheated steam will be maintained at an optimum or predetermined value.

Under the circumstances set forth in the preceding paragraph, involving decreasing rate of firing of the burners 116—118, there may be a reduction in the temperature of the gases passing between the platens of the predominantly radiantly heated sections of the reheater 106—108 but this decrease in gas temperature will be proportionately less than the reduction in flow of steam through the reheater. Thus the tendency of this section of the reheater under the pertinent conditions is to effect a reheated steam temperature greater than the predetermined or optimum temperature but this characteristic of this section of the reheater is, to some extent, offset by the opposing tendency of the predominantly convection heated reheater section 110. The optimum relation of the two different sections of the reheater is such that, under the pertinent circumstances involving decreasing load and increasing flow of recirculated gases through the hopper throat 114 is such that the final temperature of the reheated steam is maintained at an optimum value over a wide load range. Such a wide load range includes the upper part of the total load range and under increasing load when the flow of recirculated gases through the hopper throat is decreasing or has ceased, and there is maximum flow of tempering gases through the ductwork components 124—128.

In the uppermost part of the load range, and with maximum flow of tempering gases at the position of the arches 132 and 134, the tendency for the convection superheater is to effect a superheat temperature greater than optimum, but this is offset to a substantial extent by a decrease in the temperature of the gases passing over the superheater by the introduction of the maximum amount of tempering gases and the mixture with the unrecirculated gases passing directly from the burners 116—118.

As the load or rate of vapor generation decreases from maximum load the proportioning of the recycled gases is preferably automatically controlled from variables such as representations of the rate of vapor generation, representations of reheat steam temperature, and representations of superheated steam temperature. As the load decreases, a greater percentage of the recycled gases are caused to flow through the hopper throat 144 and, consequently, a lower percentage of gases through the tempering gas inlet ports between the portions 130 of the furnace chamber wall tubes. These actions continue to the lowest part of the controllable load range where the maximum percentage of recycled gases flows through the hopper throat 144, and a minimum percentage through the tempering gas inlet ports between the portions 130 of the furnace chamber wall tubes.

The flow of recycled gases or recirculated gases through the throat 144 of the hopper bottom of the furnace chamber is controlled primarily from variation in the temperature of the superheated steam, and the flow of tempering gases through the furnace chamber inlet ports between the tube portions 130 is controlled primarily from the temperature of the reheated steam and, under the circumstances, the total flow of recycled gases including the flow through the throat 144 of the hopper bottom and the gas flow through the openings between the wall tube portions 130 may not remain constant under varying loads.

Referring further to the steam generating unit indicated in Fig. 1 of the drawings, there is an economizer at the lower part of the downflow gas pass 52. This economizer consists of an upper bank 160 of closely spaced and serially connected tube sections, and a similar lower bank of tubes 162. These banks of tubes extend entirely across the flow of furnace gases and are arranged for continuous flow of water from the economizer inlet header 164 to the economizer outlet header 166 from which appropriate tubular connections lead to the water space of the drum 38.

After passing over the banks of economizer tubes 160 and 162 the heating gases, or at least part of them, flow through the outlet connection 168 to and through an air heater (not shown) adapted to heat secondary combustion supporting air for delivery by appropriate ductwork to the windbox 170 in which the burners 116—118 are disposed.

Whereas the invention has been described with reference to the details of the illustrated unit, and with reference to the details of the method effected thereby, it is to be appreciated that the invention is not to be taken as limited to all of these details. It is rather to be considered as of a scope commensurate with the scope of the subjoined claims.

I claim:

1. A method of producing power including the expansion of a high pressure elastic fluid in a plurality of stages, generating the high pressure elastic fluid by the predominantly radiant transmission of heat from high temperature heating gases to enclosed streams of vaporizable liquid, burning fuel to supply the high temperature heating gases, reheating the generated elastic fluid exhausted from the higher pressure stage of said expansions by the predominantly radiant transmission of heat from the high temperature heating gases before they have lost any substantial degree of heat by convection heat transfer, predominantly convectionally superheating the generated high pressure elastic fluid passing to the first stage of said expansions by heat transfer from the heating gases after they have lost heat in the reheating, effecting the superheating in primary and secondary superheating stages, spray attemperating the superheated fluid in the upper part of a wide load range as it passes from the primary superheating stage to the secondary superheating stage to promote the maintenance of a predetermined superheated steam temperature over a wide load range, further promoting the maintenance of the superheated fluid temperature at a predetermined value over a wide load range by withdrawing heating gases after loss of heat therefrom in the reheating and introducing the withdrawn gases into the high temperature heating gas zone directly supplied with combustion gases by the fuel burning, said introduction being effected at a position upstream of the fuel burning, increasing the percentage rate of flow of the introduced gases as the rate of vapor generation decreases, and controlling the temperature of the gases entering the reheating zone by withdrawing heating gases after loss of heat therefrom in the superheating and introducing the so withdrawn gases as tempering gases into the unrecycled gases at a position adjacent the gas entrance to the reheating zone and between the reheating zone and the fuel burning, said introduction of tempering gases being decreased as the rate of elastic fluid generation decreases and increased as the rate of fuel firing increases.

2. A method of producing power including the expansion of a high pressure elastic fluid in a plurality of stages, generating the high pressure elastic fluid by the predominantly radiant transmission of heat from high temperature heating gases to enclosed streams of vaporizable liquid, burning a slag forming fuel at temperatures above the slag fusing temperature to supply the high temperature heating gases, reheating the generated elastic fluid exhausted from the higher pressure stage of said expansions by the predominantly radiant transmission of heat from the high temperature heating gases to enclosed streams of the lower pressure fluid before the gases have lost any substantial degree of heat by convection heat transfer, predominantly convectionally superheating the generated high pressure elastic fluid passing to the first stage of said expansions by heat transfer from the heating gases after they have lost heat in the reheating, effecting the superheating in primary and secondary superheating stages, spray attemperating the superheated fluid in the upper part of a wide load range as it passes from the primary superheating stage to the secondary superheating stage to promote the maintenance of a predetermined superheated fluid temperature over a wide load range, further promoting the maintenance of the superheated fluid temperature at a predetermined value in a lower part of the load range by withdrawing heating gases after loss of heat therefrom in the reheating and introducing the withdrawn gases into the high temperature heating gas zone directly supplied with combustion gases by the fuel burning, said introduction being effected at a position upstream of the fuel burning in a gas flow sense, increasing the percentage rate of flow of the introduced gases as the rate of vapor generation decreases, and controlling the temperature of the gases entering the reheating zone by withdrawing heating gases after loss of heat therefrom in the superheating and introducing the so withdrawn gases as tempering gases into the unrecycled gases at a position adjacent the gas entrance to the reheating zone and between the reheating zone and the fuel burning, said introduction of tempering gases being controlled from the temperature of the reheated fluid to maintain such temperature substantially at a predetermined value over a wide load range.

3. A method of producing power including the expansion of a high pressure steam in a plurality of stages, generating high pressure steam by the predominantly radiant transmission of heat from high temperature heating gases, burning fuel to supply the high temperature heating gases, reheating the generated steam exhausted from a higher pressure stage of said expansions by the predominantly radiant transmission of heat from the high temperature heating gases before the gases have lost any substantial degree of heat by convection heat transfer, predominantly convectionally superheating the generated high pressure steam passing to the first stage of said expansions by heat transfer from the heating gases after they have lost heat in the reheating, effecting the superheating in primary and secondary superheating stages, spray attemperating the generated steam as it passes from the primary superheating stage to the secondary superheating state to promote the maintenance of a predetermined superheat temperature over a wide load range, further promoting the maintenance of the superheated steam temperature at a predetermined value over a wide load range by withdrawing heating gases after loss of heat therefrom in the reheating and introducing the withdrawn gases into the high temperature heating gas zone directly supplied by the fuel burning, said introduction being effected at a position spaced from the initiation of fuel burning, increasing the percentage rate of flow of the introduced gases as the rate of steam generation decreases, and controlling the temperature of the gases entering the reheating zone by withdrawing heating gases after loss of heat therefrom in the superheating and introducing the so withdrawn gases as tempering gases at a position adjacent the gas entrance to the reheating zone and between the reheating zone and the fuel burning, said introduction of tempering gases being decreased as the rate of steam generation decreases and increased as the rate of fuel firing increases, the introduction of tempering gases being controlled from the temperature of the reheated steam to maintain such temperature substantially at a predetermined value as the rate of steam generation varies over a wide range.

4. In a steam generating unit of the character described, furnace wall means including steam generating tubes defining the boundaries of a vertically elongated furnace chamber, fuel burning means for firing the furnace chamber at its lower part, a predominantly radiantly heated steam reheater formed in part by widely spaced platens of serially connected tube sections disposed in the upper part of the furnace chamber and distributed thereacross, other wall means including steam generating tubes defining a laterally disposed convection heating gas pass the inlet of which communicates with the upper part of said furnace chamber, a predominantly convectionally heated secondary steam superheater formed by a bank of closely spaced upright tubes disposed in said gas pass rearwardly of the reheater, a similarly constructed convection primary superheater disposed in said gas pass rearwardly of the secondary superheater, heating gas recycling means constructed and arranged to withdraw heating gases after loss of heat therefrom to the primary superheater and to introduce recycled gases as tempering gases into the furnace chamber at a position close to the reheater and between the fuel burning means and the reheater, and gas recycling means constructed and arranged to withdraw gases after loss of heat therefrom to the primary superheater and to introduce the withdrawn gases as recirculated gases into the furnace chamber at a position below the fuel burning means.

5. In a steam generating unit of the character described, furnace wall means including steam generating tubes defining the boundaries of a vertically elongated furnace chamber having a throated hopper bottom, coal burning means for firing the furnace chamber at its lower part and above the level of the hopper bottom, a predominantly radiantly heated steam reheater formed in part by platens of serially connected tube sections disposed in the upper part of the furnace chamber and distributed thereacross in widely spaced apart relationship, other wall means including steam generating tubes defining a laterally directed convection heating gas pass the inlet of which communicates with the upper part of said furnace chamber, a predominantly convectionally heated secondary steam superheater formed by a bank of closely spaced upright tubes disposed transversely of gas flow in said gas pass downstream of the reheater in a gas flow sense, a similarly constructed convection primary superheater downstream of the secondary superheater, heating gas recycling means constructed and arranged to withdraw heating gases after loss of heat therefrom to the primary superheater and to introduce recycled gases as tempering gases into the furnace chamber at a position close to the reheater and between the fuel burning means and the reheater, and gas recycling means constructed and arranged to withdraw gases after loss of heat therefrom to the primary superheater and to introduce the withdrawn gases as recirculated gases through the hopper bottom throat into the furnace chamber at a position below the fuel burning means.

6. In a steam generating unit of the character described, furnace wall means including steam generating tubes defined boundaries of a furnace chamber, fuel burning means for firing the furnace chamber at its lower part, a predominantly radiantly heated steam reheater formed in part by widely spaced platens of serially connected tube sections disposed in the furnace chamber and distributed thereacross, each platen having closely spaced tube sections parallel to each other and disposed with their axes in the same plane, other wall means including steam generating tubes defining a laterally directed convection heating gas pass the inlet of which communicates with a part of said furnace chamber spaced from the fuel burning means, a predominantly convectionally heated secondary steam superheater formed by a bank of closely spaced upright tubes disposed transversely of gas flow in said gas pass downstream of the reheater in a gas flow sense, a similarly constructed convection primary superheater disposed in the gas flow downstream of the secondary superheater, heating gas recycling means constructed and arranged to withdraw heating gases after loss of heat therefrom to the primary superheater and to introduce recycled gases as tempering gases in to the furnace chamber at a position close to the reheater and between the fuel burning means and the reheater, and gas recycling means constructed and arranged to withdraw gases after loss of heat therefrom to the primary superheater and to introduce the withdrawn gases as recirculated gases into the furnace chamber at a position spaced upstream from the fuel burning means.

7. In a steam generating unit of the character described, furnace wall means including steam generating tubes defined boundaries of a furnace chamber, fuel burning means for firing the furnace chamber, a predominantly radiantly heated steam reheater formed in part by widely spaced platens of serially connected tube sections disposed in a part of the furnace chamber remote from the fuel burning means, other wall means including steam generating tubes defining a convection heating gas pass the inlet of which communicates with a part of said furnace chamber adjacent the reheater and remote from the fuel burning means, a predominantly convectionally heated secondary steam superheater formed by a bank of closely spaced upright tubes disposed in said gas pass downstream of the reheater in a gas flow sense, a similarly constructed convection primary superheater disposed in said gas pass downstream of the secondary superheater, first gas recycling means constructed and arranged to withdraw heating gases after loss of heat therefrom to the primary superheater and to introduce recycled gases as tempering gases into the furnace chamber at a position close to the reheater and between the fuel burning means and the reheater, means to controllably vary the flow of tempering gases to control reheat, second gas recycling means constructed and arranged to withdraw gases after loss of heat therefrom to the primary superheater and to introduce the withdrawn gases as recirculated gases into the furnace chamber at a position below the fuel burning means, and means to controllably vary the flow of recirculated gases through said second system to control superheated steam temperature over a wide range of rate of steam generation.

8. In a power plant including a plural stage steam turbine, a steam generating unit having unitarily incorporated therein a steam reheater and a steam superheater adapted to supply steam at different pressures to the different stages of the steam turbine, high pressure steam generating means including furnace chamber walls having steam generating tubes there-along, fuel burning means adapted to supply said furnace chamber with high temperature heating gases, other wall means forming a convection heating gas pass leading from said furnace chamber at a position remote from the fuel burning means in a gas flow sense, a predominantly radiantly heated steam reheater including widely spaced platens of closely arranged tubular sections with the platens distributed across a part of the furnace chamber in front of the entrance to the gas pass, tubular means connecting the steam outlet of the reheater to the inlet of the low pressure stage of the turbine, a first gas recycling system including a fan associated with fan inlet ductwork in communication with gas flow at a position near the downstream end of the gas pass, said system also having fan outlet ductwork communicating with opposite sides of the furnace chamber at positions close to the reheater and between the reheater and the fuel burning means, a predominantly convectionally heated steam superheater having closely spaced tubes disposed transversely of gas flow downstream of the reheater and connected to receive the generated steam and supply superheated steam to the high pressure stage of the turbine, a second gas recycling system including said fan and fan inlet ductwork communicating with gas flow downstream of the superheater and fan outlet ductwork communicating with the furnace chamber at a position spaced from the fuel burning means and at least as remote from the gas pass entrance as the fuel burning means, means in the second gas recycling system whereby the flow of recycled gases therethrough may be controllably varied to maintain the temperature of superheated steam at an optimum or predetermined value over a wide load range, and means associated with the first gas recycling system whereby the flow of recycled gases therethrough may be controlled to maintain a temperature of the reheated steam at a predetermined value over a wide load range.

9. A method of producing power including the expansion of a high pressure elastic fluid in a plurality of stages, generating the high pressure elastic fluid by the predominantly radiant transmission of heat from high temperature heating gases to enclosed streams of vaporizable liquid, burning fuel to supply the high temperature heating gases, reheating the generated elastic fluid exhausted from the higher pressure stage of said expansions by the predominantly radiant transmission of heat from the high temperature heating gases before they have lost any substantial degree of heat by convection heat transfer, predominantly convectionally superheating the generated high pressure elastic fluid passing to the first stage of said expansions by heat transfer from the heating gases after they have lost heat in the reheating, withdrawing heating gases after loss of heat therefrom in the reheating and introducing the withdrawn gases into the high temperature heating gas zone directly supplied with combustion gases by the fuel burning to reduce furnace heat absorption and thereby maintain a predetermined superheated steam temperature over a wide load range, said introduction being effected at a position close to the fuel burning, increasing the percentage rate of flow of the introduced gases as the rate of vapor generation decreases, and controlling the temperature of the gases entering the reheating zone by withdrawing heating gases after loss of heat therefrom in the superheating and introducing the so withdrawn gases as tempering gases into the unrecycled gases at a position adjacent the gas entrance to the reheating zone and between the reheating zone and the fuel burning, said introduction of tempering gases being decreased as the rate of elastic fluid generation decreases and increased as the rate of fuel firing increases.

10. In a steam generating unit of the character described, furnace wall means including steam generating tubes defining the boundaries of a vertically elongated furnace chamber, fuel burning means for firing the furnace chamber at its lower part, a predominantly radiantly heated steam reheater formed by widely spaced platens of serially connected tube sections disposed in the upper part of the furnace chamber and distributed thereacross, other wall means including steam generating tubes defining a laterally disposed convection heating gas pass the inlet of which communicates with the upper part of said furnace chamber, a steam superheater formed by a bank of closely spaced upright tubes disposed in said gas pass rearwardly of the reheater, heating gas recycling means constructed and arranged to withdraw heating gases after loss of heat therefrom to the superheater and to introduce recycled gases as tempering gases into the furnace chamber at a position close to the reheater and between the fuel burning means and the reheater, and gas recycling means constructed and arranged to withdraw gases after loss of heat therefrom to the superheater and to introduce the withdrawn gases as recirculated gases into the furnace chamber at a position below the fuel burning means.

References Cited in the file of this patent

UNITED STATES PATENTS

| 2,685,279 | Caracristi | Aug. 3, 1954 |

FOREIGN PATENTS

| 514,687 | Belgium | Oct. 31, 1952 |
| 1,085,964 | France | Aug. 4, 1954 |
| 1,077,651 | France | May 5, 1954 |